(12) United States Patent
Montgomery

(10) Patent No.: US 11,070,708 B2
(45) Date of Patent: Jul. 20, 2021

(54) SELF-CONTAINED LOW PROFILE CROSS SHOOTING VIDEO APPARATUS

(71) Applicant: BRAINBABY INC., Santa Monica, CA (US)

(72) Inventor: Michael Montgomery, Santa Monica, CA (US)

(73) Assignee: Brainbaby, Inc., Santa Monica, CA (US)

( * ) Notice: Subject to any disclaimer, the term of this patent is extended or adjusted under 35 U.S.C. 154(b) by 0 days.

(21) Appl. No.: 16/586,513

(22) Filed: Sep. 27, 2019

(65) Prior Publication Data

US 2020/0106931 A1    Apr. 2, 2020

Related U.S. Application Data

(60) Provisional application No. 62/738,814, filed on Sep. 28, 2018.

(51) Int. Cl.
*H04N 5/225* (2006.01)
*H04N 5/232* (2006.01)
*H04N 5/247* (2006.01)

(52) U.S. Cl.
CPC ......... *H04N 5/2251* (2013.01); *H04N 5/2257* (2013.01); *H04N 5/23203* (2013.01); *H04N 5/247* (2013.01)

(58) Field of Classification Search
CPC ............... H04N 5/2251; H04N 5/2257; H04N 5/23203; H04N 5/247; H04N 5/23299; H04N 5/222; F16M 11/38; F16M 11/046; F16M 2200/061; F16M 11/18; G03B 41/00
See application file for complete search history.

(56) References Cited

U.S. PATENT DOCUMENTS

| | | | |
|---|---|---|---|
| 3,893,145 A | 7/1975 | King | |
| 6,439,515 B1 | 8/2002 | Powers | |
| 2011/0249100 A1 | 10/2011 | Jayaram et al. | |
| 2013/0188059 A1* | 7/2013 | Georgeson | G01N 21/94 348/169 |
| 2015/0281590 A1* | 10/2015 | MacMillan | H04N 5/2628 348/218.1 |

FOREIGN PATENT DOCUMENTS

EP    3078190    10/2016

\* cited by examiner

*Primary Examiner* — Mekonnen D Dagnew
(74) *Attorney, Agent, or Firm* — Stradling Yocca Carlson & Rauth

(57) ABSTRACT

A recording arrangement is provided including an outer enclosure including a plurality of video recording devices and a matching plurality of audio recording devices, at least one extender configured to deploy the plurality of video recording devices to a desired location, extender deployment hardware configured to drive the at least one extender, and electronics configured to drive the at least one extender, the electronics comprising a power supply, a timecode generator, a plurality of recorders, and an internet protocol (IP) assembly configured to facilitate interface with a remote computing device.

19 Claims, 5 Drawing Sheets

SELF-CONTAINED LOW PROFILE CROSS SHOOTING VIDEO APPARATUS

This application claims the benefit of U.S. Provisional Patent Application Ser. No. 62/738,814, filed Sep. 28, 2018, entitled "Self-Contained Low Profile Cross Shooting Video Apparatus," inventor Michael Montgomery, the entirety of which is incorporated herein by reference.

BACKGROUND OF THE INVENTION

Field of the Invention

The present invention relates generally to the field of video and film production, and more specifically to simultaneously filming multiple subjects.

Description of the Related Art

In film and video production, it is commonly required to record picture and audio of two or more relatively static subjects interacting while facing each other. In some instances the subjects can be positioned several feet apart. Typically, filming in this scenario requires positioning at least two cameras, either handheld or mounted on tripods or equivalent stabilizing devices, each camera manned by a camera operator. This type of filming is commonly called 'cross shooting'.

Cross-shooting usually requires that the 'point of view' of one camera (Camera A) be positioned alongside or behind one (or more) of the subjects (Subject A) and directed over or past the shoulder of Subject A toward one (or more) of the subjects (Subject B), such that Subject B is framed almost 'front-on', thereby providing a clear shot of the subject that to some extent 'mirrors' the point of view of Subject A. In so doing, this arrangement provides a photographic composition of Subject A that is aesthetically pleasing and avoids Camera A being within the video frame. Similarly, Camera B is typically positioned on the same side as Camera A of an infinite linear axis known as 'the line' connecting the two subjects. Camera B is similarly directed over or past the shoulder of Subject B such that is framed desirably on Subject A and avoids Subject B and Camera A within the video frame. Furthermore, cross-shooting avoids the undesirable and disorienting effect of 'crossing the line', a camera configuration where cameras are on different sides of the aforementioned axis such that the footage from the two cameras, once edited together into an apparently real-time narrative scene, produces a disorienting and therefore undesirable experience for the viewer.

Examples of scenarios that often require cross-shooting are numerous, and include one-on-one interviews, restaurant, cafe or dinner scenes, business meetings, and so on. Cross-shooting is used for any scenario where two or more subjects are seated opposite each other and their interactions are directed toward each other.

In all production but particularly unscripted television, such as 'reality' television recorded in non-artificially constructed locations where the location is not entirely dedicated to the filming, brining and setting up equipment can be costly and time consuming Camera equipment is bulky, film crews can be large and invasive, and for this reason cross-shooting set-ups in such spaces, or essentially "on the fly" can be inconvenient and undesirable for the location administrators. Location fees are expensive, filming permissions can be difficult to obtain, and anything adding to cost, complexity, or time required for filming is generally undesirable.

It would therefore be advantageous to provide a system that overcomes the issues and limitations of current devices and arrangements used to film multiple subjects in a non-artificially constructed location, particularly in view of the complexity, cost, and challenges such filming faces.

SUMMARY OF THE INVENTION

According to one embodiment of the present design, there is provided a self-contained recording arrangement, comprising an outer enclosure comprising a plurality of video recording devices and a matching plurality of audio recording devices, deployment hardware configured to deploy the plurality of video recording devices to a desired location, means for moving the deployment hardware, and electrical component hardware comprising a power supply, a timecode generator, a plurality of recorders, and an internet protocol (IP) assembly configured to facilitate interface with a remote computing device. The electrical component hardware is configured to deploy the plurality of video recording devices in a desired orientation for video recording multiple subjects using the means for moving the deployment hardware to position the video recording devices in a desired orientation for video recording multiple subjects.

According to a further embodiment of the present design, there is provided a recording arrangement comprising an outer enclosure comprising a plurality of video recording devices and a matching plurality of audio recording devices, at least one extender configured to deploy the plurality of video recording devices to a desired location, extender deployment hardware configured to drive the at least one extender, and a power supply, a timecode generator, a plurality of recorders, and an internet protocol (IP) assembly configured to facilitate interface with a remote computing device. The power supply, the timecode generator, the plurality of recorders, and the internet protocol (IP) assembly are collectively configured to deploy the plurality of video recording devices using the extender deployment hardware by commanding and effectuating a repositioning of the at least one extender to position the plurality of video recording devices in a desired orientation for video recording multiple subjects.

According to another embodiment of the present design, there is provided a recording arrangement comprising an outer enclosure comprising a plurality of video recording devices and a matching plurality of audio recording devices, at least one extender configured to deploy the plurality of video recording devices to a desired location, extender deployment hardware configured to drive the at least one extender, and electronics configured to drive the at least one extender, the electronics comprising a power supply, a timecode generator, a plurality of recorders, and an internet protocol (IP) assembly configured to facilitate interface with a remote computing device.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

DETAILED DESCRIPTION

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others.

The present design provides a self contained and portable arrangement usable to film or otherwise visually record multiple subjects without the need for extensive setup. The present design provides a technical solution to the intrusiveness of such shoots by reducing the amount of hardware required at filming locations, minimizing the installation process and the quantity of crew required. The likelihood of filming permissions being granted can increase and the costs of filming can decrease. The design is self-contained and can be left at the location if desired, reducing the inconvenience of deinstallation. Furthermore, since the filming equipment is unobtrusive, subject performance can be more natural and authentic.

Figure 1:
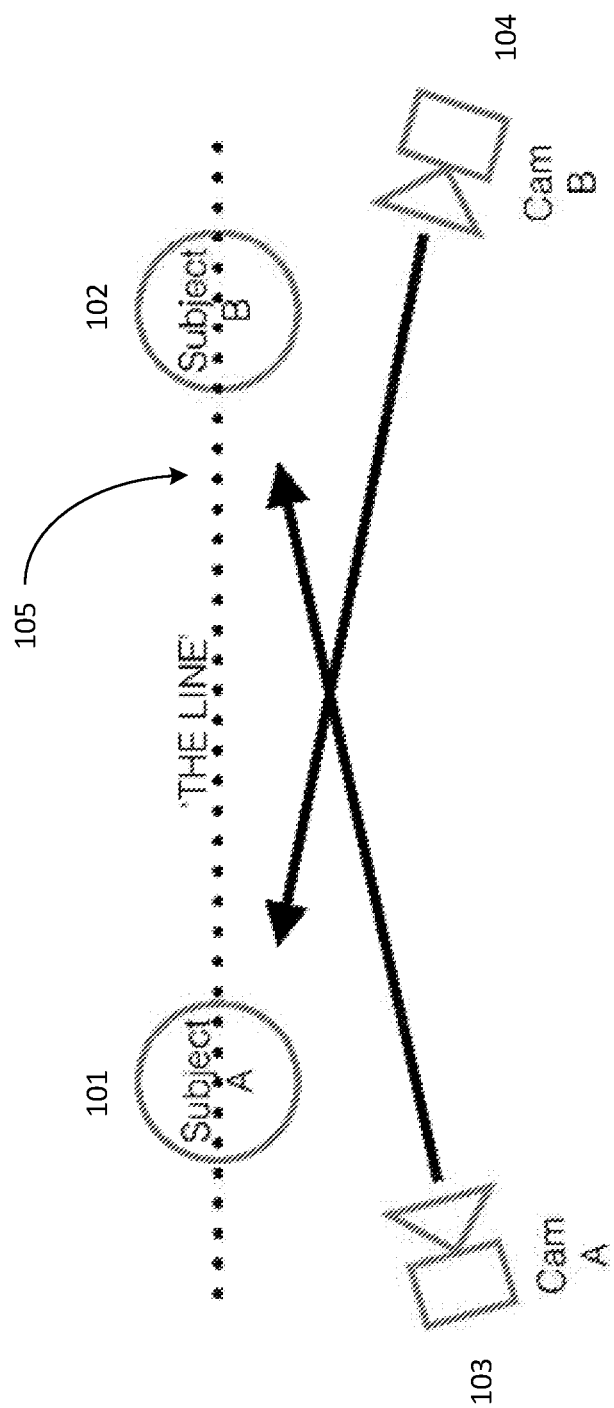
FIG. 1 illustrates the general arrangement for a "cross shoot" of two subjects.

FIG. 1 illustrates the "cross shooting" issue described above. From FIG. 1, subject A 101 is positioned in line with subject B 102 along "the line" 105, essentially representing the line of oral communication or the line of sight between subject A 101 and subject B 102. Camera A 103 is positioned proximate subject A 101 and records subject B 102, while camera B 104 is positioned proximate subject B 102 and records subject A 101. Typical convention prohibits camera A 103 from being across line 105 from camera B.

Figure 2:
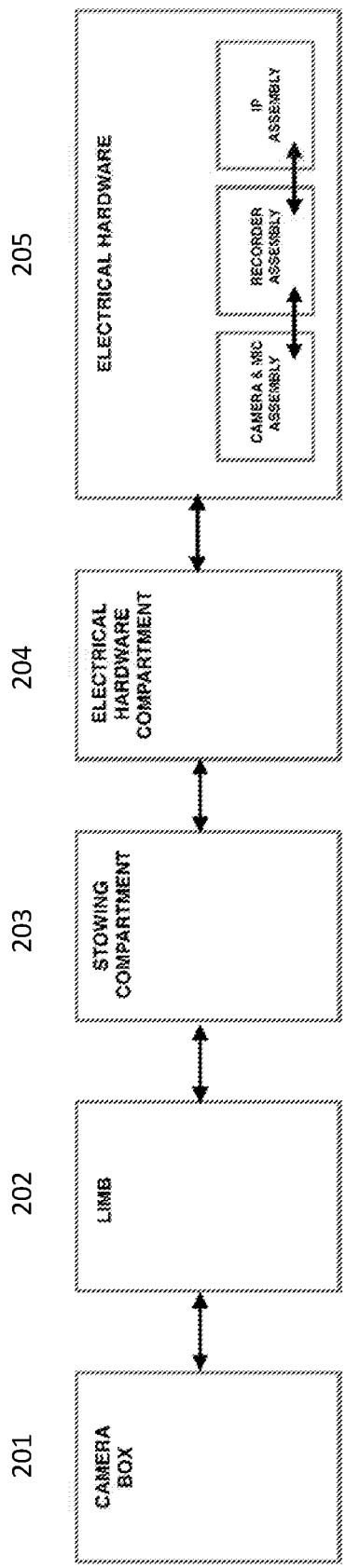
FIG. 2 shows a broad, general conceptual overview of the present design including the components employed.

A general overall conceptual representation of the system is presented in FIG. 2. FIG. 2 illustrates a camera box 201, including a camera mount, a protective camera case, a camera and optionally a microphone. Limb 202 is a maneuverable limb, optionally controlled remotely, that can be orientated from a 'stowed' position to a position appropriate for 'cross-shooting'. Stowing compartment 203 is a space or location for unobtrusive and convenient stowing of the camera box. Electrical hardware compartment 204 represents a space for the secure storage of electrical hardware that enables camera functionality, while electrical hardware 205 consists of hardware associated with the camera and microphone assembly, as well as hardware associated with encoding and recording the video footage, and optionally an IP assembly (internet protocol assembly) that serves to connect the on-location PC with remote servers such that the content can be streamed, and the cameras controlled via IP.

The device is a self-contained module (although in some instances can be a pair of self-contained modules, each with a single camera), that can be temporarily located or permanently installed at a filming location in the manner described above, incorporating a pair of cameras maneuverable from a 'stowed' configuration to a 'cross-shooting' configuration without the need for a camera operator or other film crew member. Such maneuvering can be achieved manually or by the use of hydraulics, pulleys, motors, or the like.

Figure 3:
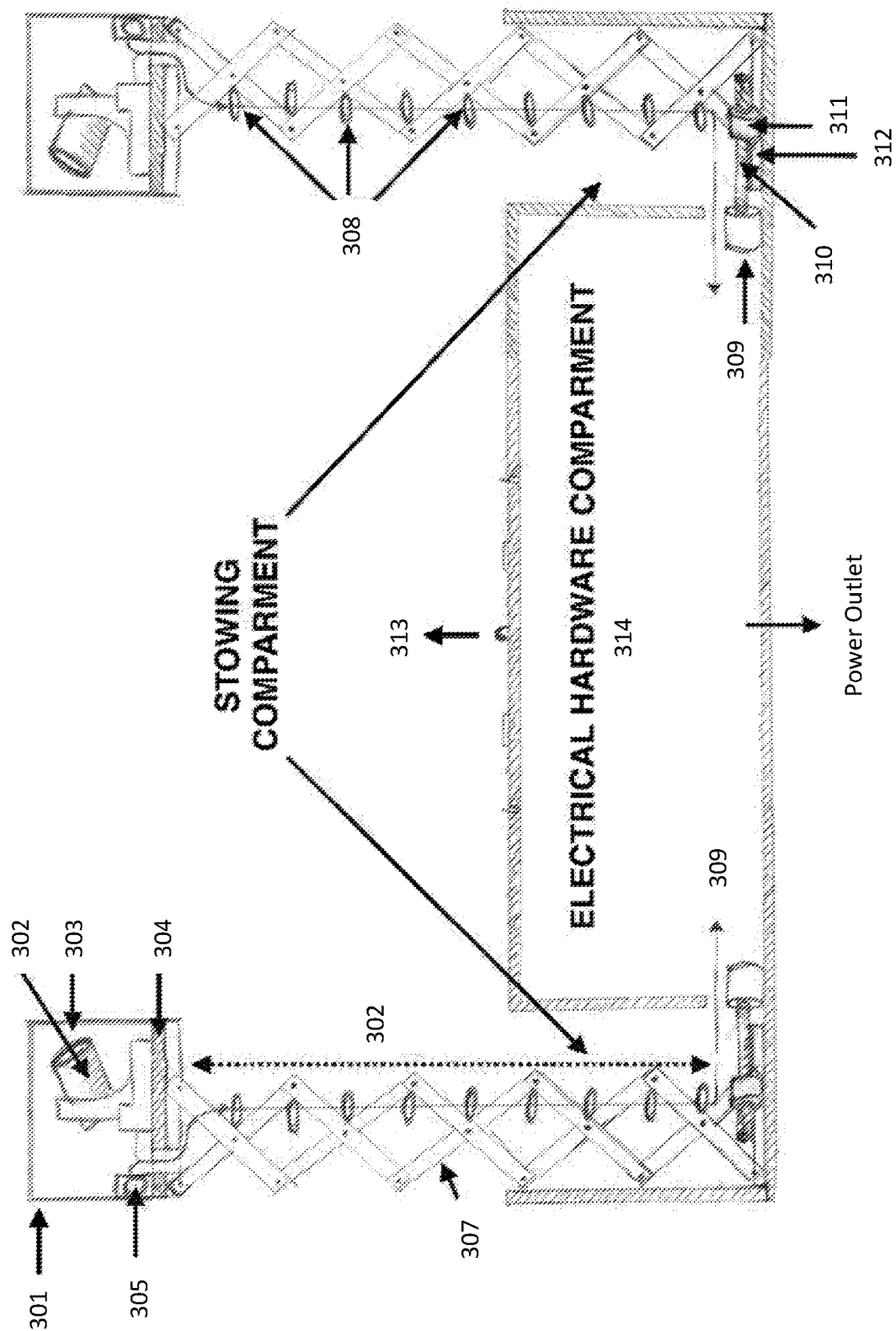
FIG. 3 is a specific view of the components provided in the present self-contained and portable design.

FIG. 3 illustrates the overall device when deployed. From FIG. 3, there is provided a camera box 301 comprising an enclosed protective and secure camera enclosure with a shooting aperture or window (303) aligned with a desired orientation for filming using the camera. The camera box 301 can be made of any reasonable material under the circumstances, including mesh, plexiglas, glass, or any opaque protective materials that can accommodate a transparent or open aperture for shooting/filming. In this instance the camera aperture is covered with a plexiglas window, and the camera box is shaped such that it fits securely into the stowing compartment while in the fully retracted position.

Camera 302 may be an Internet Protocol (IP) Pan-Tilt-Zoom (PTZ) camera. While a static video camera can be used, there are various models of remotely controllable industry-standard CCTV, Video-Conferencing or Television cameras may be employed in this design. In this instance, a PTZ hi-definition video-conferencing camera, remotely controllable by IP software installed on associated electrical hardware may be employed. A microphone 305 is optionally patched into the camera 302, again typically a PTZ camera. Camera mount and baseplate 304 is a baseplate upon which the camera is mounted, connected to a horizontal camera mount which is in turn securely mounted to extendable limb 306. Extendable limb 306 may be any extendable limb or camera support that can support the camera as it maneuvers between a 'stowed' position and a 'cross-shooting' position. A variety of mechanisms can be used to maneuver the camera 301 and associated parts into position, including but not limited to manual, hydraulic and/or pneumatic telescopic limbs, hinged or rotating or swivel arms. In this embodiment, extendable limb 306 features a scissor mechanism that can extend or retract on the vertical axis. The mechanism to achieve this functionality in this embodiment features linked, folding struts in a parallel 'criss-cross' lattice of interlocking metallic hinged struts knowns as a scissor mechanism or pantograph, specifically identified in FIG. 3 as pantograph 307. According to this embodiment, each limb comprises two lattices, connected to each other by pinions which also act as the rotational hinges within the lattice at both at the ends and in the middle of the struts.

Cables are needed to connect each camera and microphone to the electronic hardware in the compartment. A series of rings or tethers are provided as cable-run 308, connected to the pinions on alternate sides of the scissor mechanism/pantograph 307 and acting as 'cable ties', restricting the movement of cables running through the scissor mechanism, especially in a retracted orientation. A degree of tension in the cables is provided to prevent the cables from interfering and blocking the scissor mechanism/pantograph 307 as it collapses. A wireless connection may also be provided connecting the camera system to other hardware on site.

Bi-directional rotational motor 309 is provided with a switch. The bi-directional rotational motor 309 provides vertical motion of camera platform, via the scissor mechanism/pantograph 307, by the application or reduction of pressure to the lowest set of supports, 'narrowing and elongating' or 'widening and shortening' the lattice, thereby propelling the platform vertically upward or downward. Examples of mechanisms that can achieve this effect include but are not limited to manual, hydraulic and/or lever systems. In this embodiment, there is provided a rotational motor connected to a rod with a thread 310 that runs through a cylinder 311 with a thread not unlike a traditional bolt connected to the lower struts on the scissor mechanism. The innermost ends of the lowermost struts may be provided on a sliding track 312 enabling them to stably move along a horizontal axis, while the outermost ends of the lowermost struts are fixed to the module frame as the lattice narrows or widens. In this embodiment, the motor may be controlled in both rotational directions by a remotely controlled switch such that the platform can be extended or retracted via IP. The electrical hardware compartment 314 may be affixed to the ground and acts as a protective and secure mount for the electronic hardware required to control the two cameras, microphones and limbs via IP using the location Wifi. The electrical hardware compartment 314 serves as a rostrum connecting the two limb and camera assemblies such that the entire invention is a single self-enclosed module. For security and maintenance access purposes, the electrical hardware compartment 314 has a lockable hinged lid 313. The sides of the electrical hardware compartment may include air vents aligned with the fan vents on electronic hardware provided therein to assist with cooling. A hole may be provided in the back of the electrical hardware compartment through which a power cable runs such that the internal hardware can be connected via outlet multipliers to an external power supply on location.

In one arrangement, the cameras may be rotatable, either on their baseplates or by a rotational element placed below pantograph 307 in the arrangement of FIG. 3. Raising and lowering of cameras coupled with rotational capability, as well as an ability for the camera to rotate up and down allows for video recording of each subject at virtually any angle. Further, some dynamic positioning of the camera may be undertaken, such as moving sideways if the subject moves sideways. Again, it is desired to not cross "the line" between the two subjects as shown in FIG. 1, but this arrangement is generally conducive to two subjects positioned such that each camera remains on one side of "the line" at all times.

Figure 4:
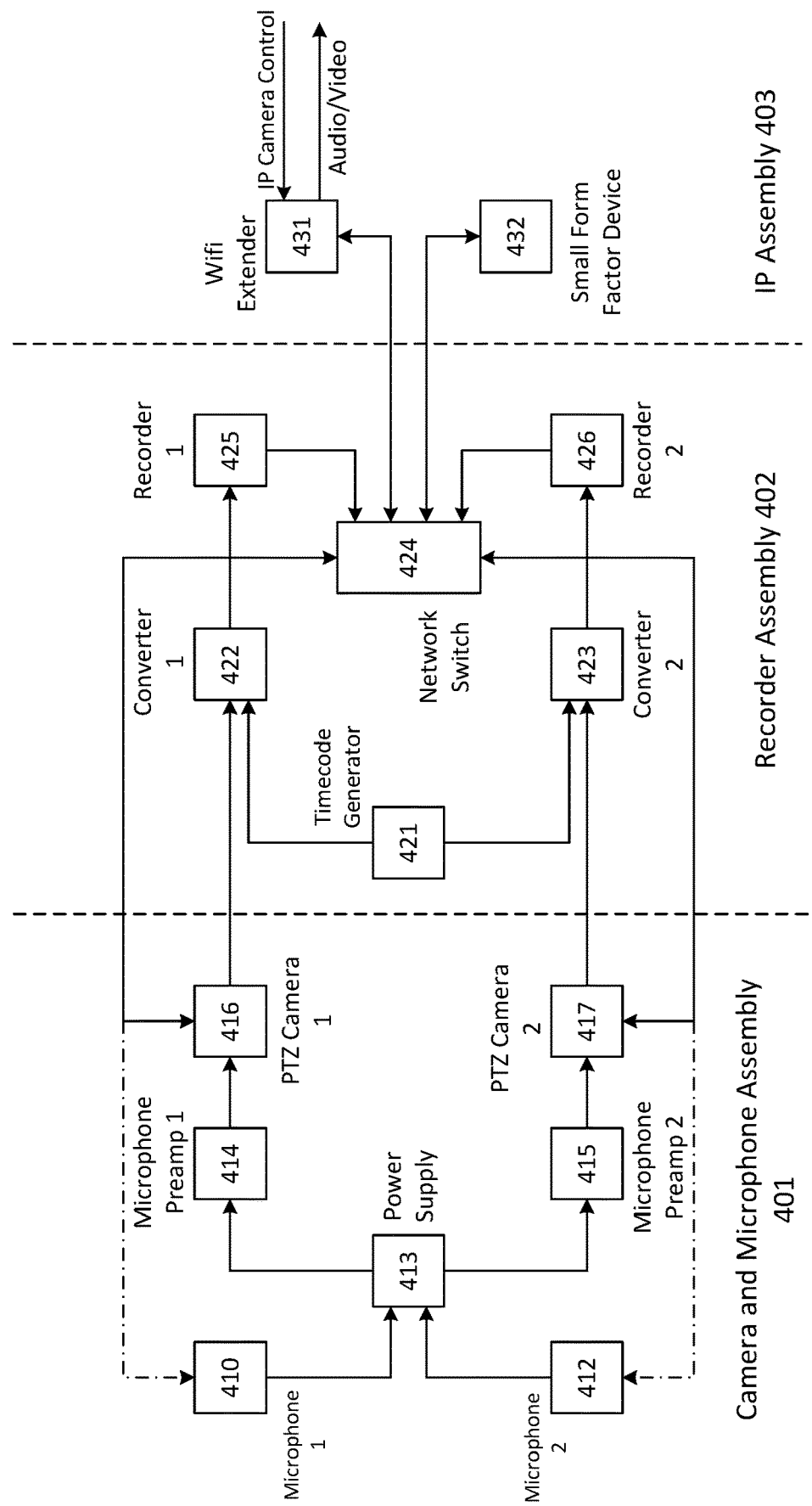
FIG. 4 shows the components of the electrical hardware employed to operate the design elements.

FIG. 4 illustrates an embodiment of the electrical hardware components and configuration for the present design. From FIG. 4, there is provided a camera and microphone assembly 401, recorder assembly 402, and an IP assembly 403. In general, inside the electrical hardware compartment is mounted a configuration of electrical hardware that records video and audio content. The system is configured such that the limb and PTZ cameras live-stream content and can be remotely initiated and controlled by IP.

Camera and microphone assembly includes two microphones 411 and 412 and two PTZ cameras 416 and 417. Each PTZ camera is a PTZ HD camera controlled remotely, recording video or moving images of one subject. Each microphone 411 and 412 is a directional microphone that records audio from one subject. The microphone phantom power convertor 413 converts standard outlet power to microphone-compatible power, and two microphone preamplifiers 414 and 415 are provided in this arrangement. Each microphone preamplifier converts weak microphone output signals to stronger signals appropriate for processing.

The recorder assembly 402 includes a small sized personal computer or computing device with a built in harddrive. The recorder assembly acts as the base unit for software discussed below. Remote control functionality may be offered, wherein the ability to control the PC may be provided. Camera-compatible web-based software may provide IP control of both PTZ cameras 416 and 417 and other devices in the arrangement. Such software, hardware, and/or firmware may direct audio and video streams to the SD recorder. A dual output timecode generator 421 embeds a timestamped signal that is embedded in the audio and video signals from the cameras, thereby enabling synchronization of video files. HDMI to SDI convertors 422 and 423 receive a timecode signal from timecode generator 421 and both audio and video signals from PTZ cameras 416 and 417, combines the timecode and audio/video received into a single timestamped signal, and delivers the timestamped signal to recorders 425 and 426, which may be SD card recorders. Recorders 425 and 426 convert the audio and video signal to remotely accessible files and make the converted files available from storage devices, such as SD memory cards. A network switch 424, which may be an eight port network switch, receives information from PTZ cameras 416 and 417, recorders 425 and 426, and interfaces with components of the IP assembly 403. The IP assembly 403 in this embodiment includes a Wifi extender or repeater 431 connected to local area Wifi and allowing all devices to connect wirelessly to local Wifi via network switch 424, which uses packet switching to receive, process, and forward data to a Wifi network. Small form factor device 432 represents a small computing device, and any small form factor device may be employed and may interface with network switch 424. Software may be provided to enable both camera control from a remote device and may enable transmission of audio and video to a remote device or devices for the purpose of broadcasting the two video and audio streams (timestamped) that have been collected.

In this manner, there is provided a self-contained and remotely controllable arrangement comprising two cameras and microphones able to record two separate subjects from a remote location. The system may be set in a desired location, is transportable, and upon setup cameras may be positioned to record the two desired subject in a short amount of time without the need for human intervention other than transporting the arrangement to a desired location. When audio and video recording is complete, the recorded timestamped audio and video may be transmitted to a remote processing computing device, and the arrangement may be repositioned within the container and the container transported to another location. Such a device does not require extensive setup or camera operators and serves to provide a two subject shoot in an efficient and economical manner in a package or arrangement that is readily transportable.

Figure 5:
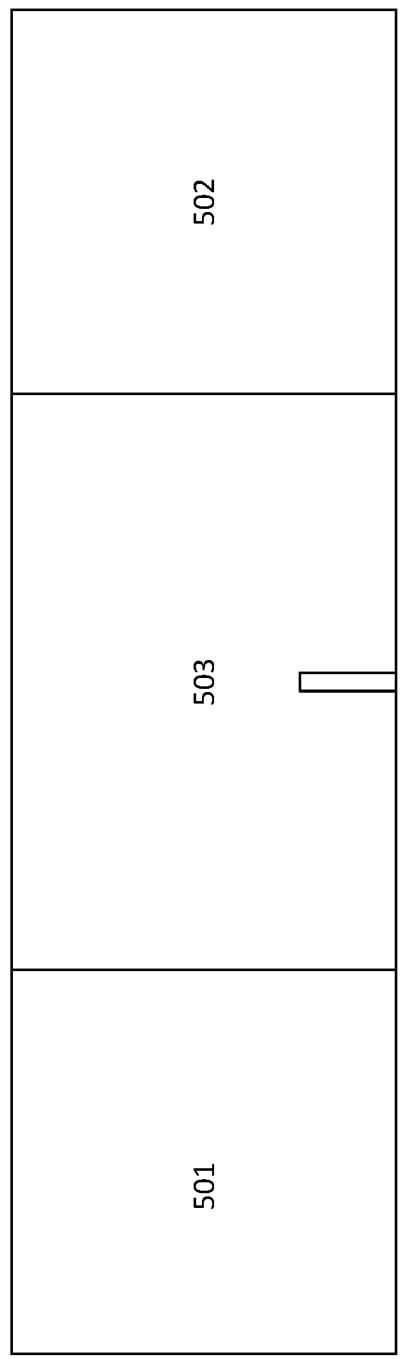
FIG. 5 is an overhead view of the design in a stowed configuration.

FIG. 5 is a top view of the apparatus in a stowed configuration. FIG. 5 is a general representation, and as shown, doors 501 and 502 are doors within which cameras are positioned. Electrical hardware compartment 503 includes a lockable hinged lid. In this manner, the device can be stowed, including cameras, associated hardware, and all electronics, and transported to a different location.

While two cameras are shown employed in the present design, together with other components, it is to be noted that fewer components may be employed while still operating according to the present teachings. In one instance, fewer than two cameras or camera arrangements may be employed. Additionally, microphones may be located on top of camera boxes, and hydraulic posts may be used instead of a pantograph.

Thus according to one embodiment, there is provided a self-contained recording arrangement, comprising an outer enclosure comprising a plurality of video recording devices and a matching plurality of audio recording devices, deployment hardware configured to deploy the plurality of video recording devices to a desired location, means for moving the deployment hardware, and electrical component hardware comprising a power supply, a timecode generator, a plurality of recorders, and an internet protocol (IP) assembly configured to facilitate interface with a remote computing device. The electrical component hardware is configured to deploy the plurality of video recording devices in a desired orientation for video recording multiple subjects using the means for moving the deployment hardware to position the video recording devices in a desired orientation for video recording multiple subjects.

According to a further embodiment of the present design, there is provided a recording arrangement comprising an outer enclosure comprising a plurality of video recording devices and a matching plurality of audio recording devices, at least one extender configured to deploy the plurality of video recording devices to a desired location, extender deployment hardware configured to drive the at least one extender, and a power supply, a timecode generator, a plurality of recorders, and an internet protocol (IP) assembly configured to facilitate interface with a remote computing device. The power supply, the timecode generator, the plurality of recorders, and the internet protocol (IP) assembly are collectively configured to deploy the plurality of video recording devices using the extender deployment hardware by commanding and effectuating a repositioning of the at least one extender to position the plurality of video recording devices in a desired orientation for video recording multiple subjects.

According to another embodiment of the present design, there is provided a recording arrangement comprising an outer enclosure comprising a plurality of video recording devices and a matching plurality of audio recording devices, at least one extender configured to deploy the plurality of video recording devices to a desired location, extender deployment hardware configured to drive the at least one extender, and electronics configured to drive the at least one extender, the electronics comprising a power supply, a timecode generator, a plurality of recorders, and an internet protocol (IP) assembly configured to facilitate interface with a remote computing device.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, i.e. may include transitory and/or non-transitory computer readable media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A self-contained recording arrangement, comprising:
   an outer enclosure configured to receive and maintain therein:
      a plurality of video recording devices and a matching plurality of audio recording devices;
      deployment hardware configured to deploy the plurality of video recording devices to a desired location;
      means for moving the deployment hardware; and
      electrical component hardware comprising a power supply, a timecode generator, a plurality of recorders, and an interne protocol (IP) assembly configured to facilitate interface with a remote computing device;
   wherein the outer enclosure and all components therein are collectively portable to different physical locations, and further wherein the electrical component hardware is configured to deploy the plurality of video recording devices to positions outside the outer enclosure, the plurality of video recording devices deployable in a desired relative orientation for video recording multiple subjects using the means for moving the deployment hardware, wherein the relative orientation is a cross-shooting orientation wherein a first subject on a left side is video recordable by a first video recording device positioned on a right side and a second subject on the right side is video recordable by a second video recording device on the left side.

2. The self-contained recording arrangement of claim 1, wherein each video recording device of the plurality of video recording devices is located on a rotatable baseplate.

3. The self-contained recording arrangement of claim 1, wherein the deployment hardware comprises a pantograph.

4. The self-contained recording arrangement of claim 1, wherein the means for moving the deployment hardware comprises a manual system.

5. The self-contained recording arrangement of claim 1, wherein the means for moving the deployment hardware comprises a hydraulic system.

6. The self-contained recording arrangement of claim 1, wherein the means for moving the deployment hardware comprises a lever system.

7. The self-contained recording arrangement of claim 1, wherein the plurality of video recording devices comprise two cameras each positioned at a different end of the outer enclosure outward from a compartment enclosing the electrical component hardware.

8. A recording arrangement comprising:
   an outer enclosure containing therein:
      a plurality of video recording devices and a matching plurality of audio recording devices;
      at least one extender configured to deploy the plurality of video recording devices to a desired location;
      extender deployment hardware configured to drive the at least one extender; and a power supply, a timecode generator, a plurality of recorders, and an internet protocol (IP) assembly configured to facilitate interface with a remote computing device;

wherein the outer enclosure and all components therein are collectively portable to different physical locations, and further wherein the power supply, the timecode generator, the plurality of recorders, and the interne protocol (IP) assembly are collectively configured to deploy the plurality of video recording devices using the extender deployment hardware by commanding and effectuating a repositioning of the at least one extender to position the plurality of video recording devices at a relative orientation outside the outer enclosure in a desired orientation for video recording multiple subjects;

wherein the relative orientation is a cross-shooting orientation wherein a first subject on a left side is video recordable by a first video recording device positioned on a right side and a second subject on the right side is video recordable by a second video recording device on the left side.

9. The recording arrangement of claim 8, wherein each video recording device of the plurality of video recording devices is located on a rotatable baseplate.

10. The recording arrangement of claim 8, wherein the extender deployment hardware comprises a pantograph.

11. The recording arrangement of claim 8, wherein the extender deployment hardware comprises a manual system.

12. The recording arrangement of claim 8, wherein the extender deployment hardware comprises a hydraulic system.

13. The recording arrangement of claim 8, wherein the extender deployment hardware comprises a lever system.

14. The recording arrangement of claim 8, wherein the plurality of video recording devices comprise two cameras each positioned at a different end of the outer enclosure outward from a compartment enclosing the power supply, the timecode generator, the plurality of recorders, and the internet protocol (IP) assembly.

15. A recording arrangement comprising:
an outer enclosure containing therein:
a plurality of video recording devices and a matching plurality of audio recording devices;
at least one extender configured to deploy the plurality of video recording devices to a desired location;
extender deployment hardware configured to drive the at least one extender; and
electronics configured to drive the at least one extender, the electronics comprising a power supply, a timecode generator, a plurality of recorders, and an internet protocol (IP) assembly configured to facilitate interface with a remote computing device;
wherein the outer enclosure and all components therein are collectively portable to different physical locations, and further wherein the relative orientation is a cross-shooting orientation wherein a first subject on a left side is video recordable by a first video recording device positioned on a right side and a second subject on the right side is video recordable by a second video recording device on the left side.

16. The recording arrangement of claim 15, wherein the power supply, the timecode generator, the plurality of recorders, and the internet protocol (IP) assembly are collectively configured to deploy the plurality of video recording devices using the extender deployment hardware.

17. The recording arrangement of claim 16, wherein deploying the plurality of video recording devices using the extender deployment hardware comprises commanding and effectuating a repositioning of the at least one extender to position the plurality of video recording devices in a desired orientation for video recording multiple subjects.

18. The recording arrangement of claim 15, wherein each video recording device of the plurality of video recording devices is located on a rotatable baseplate.

19. The recording arrangement of claim 15, wherein the extender deployment hardware comprises a pantograph.

* * * * *